US012608481B2

(12) United States Patent
Singh et al.

(10) Patent No.: US 12,608,481 B2
(45) Date of Patent: Apr. 21, 2026

(54) OFFLOADING SECURE BOOT DURING STARTUPS OF DATA PROCESSING SYSTEMS

(71) Applicant: Dell Products L.P., Round Rock, TX (US)

(72) Inventors: Ankit Singh, Bangalore (IN); Shrikant U. Hallur, Bangalore (IN); Naveen Awasthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 18/618,346

(22) Filed: Mar. 27, 2024

(65) Prior Publication Data

US 2025/0307411 A1      Oct. 2, 2025

(51) Int. Cl.
*G06F 9/4401*          (2018.01)
*G06F 21/57*           (2013.01)

(52) U.S. Cl.
CPC .......... *G06F 21/575* (2013.01); *G06F 9/4401* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 6,668,376 | B1 | 12/2003 | Wang |
| 6,854,054 | B1 | 2/2005 | Kavanagh |
| 7,130,997 | B2 | 10/2006 | Hsu |
| 8,136,900 | B2 | 3/2012 | Iwasaki |
| 8,346,985 | B2 | 1/2013 | Chassot |
| 9,152,402 | B2 | 10/2015 | Scheidel et al. |
| 9,875,115 | B2 | 1/2018 | Russinovich |
| 9,990,325 | B2 | 6/2018 | Hetzler |
| 10,901,627 | B1 | 1/2021 | Bshara |
| 11,212,123 | B2 | 12/2021 | Yoon |
| 11,282,161 | B2 | 3/2022 | Ray et al. |
| 11,489,827 | B2 | 11/2022 | Knotwell et al. |
| 11,556,359 | B2 | 1/2023 | Hart et al. |
| 11,768,781 | B2 | 9/2023 | Cooray et al. |
| 11,770,246 | B2 | 9/2023 | Ong |
| 11,775,651 | B2 | 10/2023 | Jacobs |

(Continued)

OTHER PUBLICATIONS

Seongwook, Jin et al., "Architectual Support for Secure Virtualization under a Vulnerable Hypervisor", 2011 44th Annual IEEE/ACM International Symposium on Microarchitecture (MICRO), Porto Alegre, Brazil, 2011, pp. 272-283 (12 pages).

*Primary Examiner* — Paul Yen
(74) *Attorney, Agent, or Firm* — WOMBLE BOND DICKINSON (US) LLP

(57)            ABSTRACT

Methods and systems for managing operation of a data processing system are disclosed. The data processing system may be managed during a startup process for the data processing system. The startup process may use startup data to enable functionality of hardware resources of the data processing system. During the startup process, the startup data may be validated by a management controller of the data processing system operating independently from the hardware resources. The management controller may report a validation state for the startup data to the hardware resources, and the hardware resources may use the validation state to guide completion of the startup process.

20 Claims, 5 Drawing Sheets

(56)     References Cited

U.S. PATENT DOCUMENTS

| 12,299,184 | B2 | 5/2025 | Wheeler | |
|---|---|---|---|---|
| 12,353,609 | B2 | 7/2025 | Nelogal | |
| 2004/0210897 | A1 | 10/2004 | Brockway | |
| 2007/0198996 | A1 | 8/2007 | Chiu | |
| 2009/0054045 | A1 | 2/2009 | Zakrzewski | |
| 2011/0055541 | A1 | 3/2011 | Lee | |
| 2012/0023319 | A1 | 1/2012 | Chin | |
| 2012/0060023 | A1 | 3/2012 | Park | |
| 2013/0276144 | A1 | 10/2013 | Hansen | |
| 2016/0364297 | A1 | 12/2016 | Lo | |
| 2018/0032349 | A1 | 2/2018 | Bhimanadhuni | |
| 2019/0068772 | A1 | 2/2019 | Lo | |
| 2020/0074083 | A1* | 3/2020 | Hou | G06F 11/1417 |
| 2020/0242051 | A1 | 7/2020 | Bisa | |
| 2020/0244445 | A1 | 7/2020 | Ponnusamy | |
| 2020/0250293 | A1 | 8/2020 | Paulraj | |
| 2020/0356669 | A1 | 11/2020 | Kim | |
| 2021/0034132 | A1 | 2/2021 | Hamlin | |
| 2021/0099519 | A1* | 4/2021 | Christian | H04L 12/1827 |
| 2022/0222349 | A1* | 7/2022 | Lambert | G06F 13/4282 |
| 2023/0132176 | A1 | 4/2023 | Nelogal | |
| 2023/0136229 | A1 | 5/2023 | Lee | |
| 2023/0229454 | A1 | 7/2023 | Lagnado | |
| 2023/0259291 | A1* | 8/2023 | Porzio | G06F 12/0238 |
| | | | | 711/154 |
| 2023/0259472 | A1 | 8/2023 | Azam | |
| 2023/0297261 | A1 | 9/2023 | Kim | |

* cited by examiner

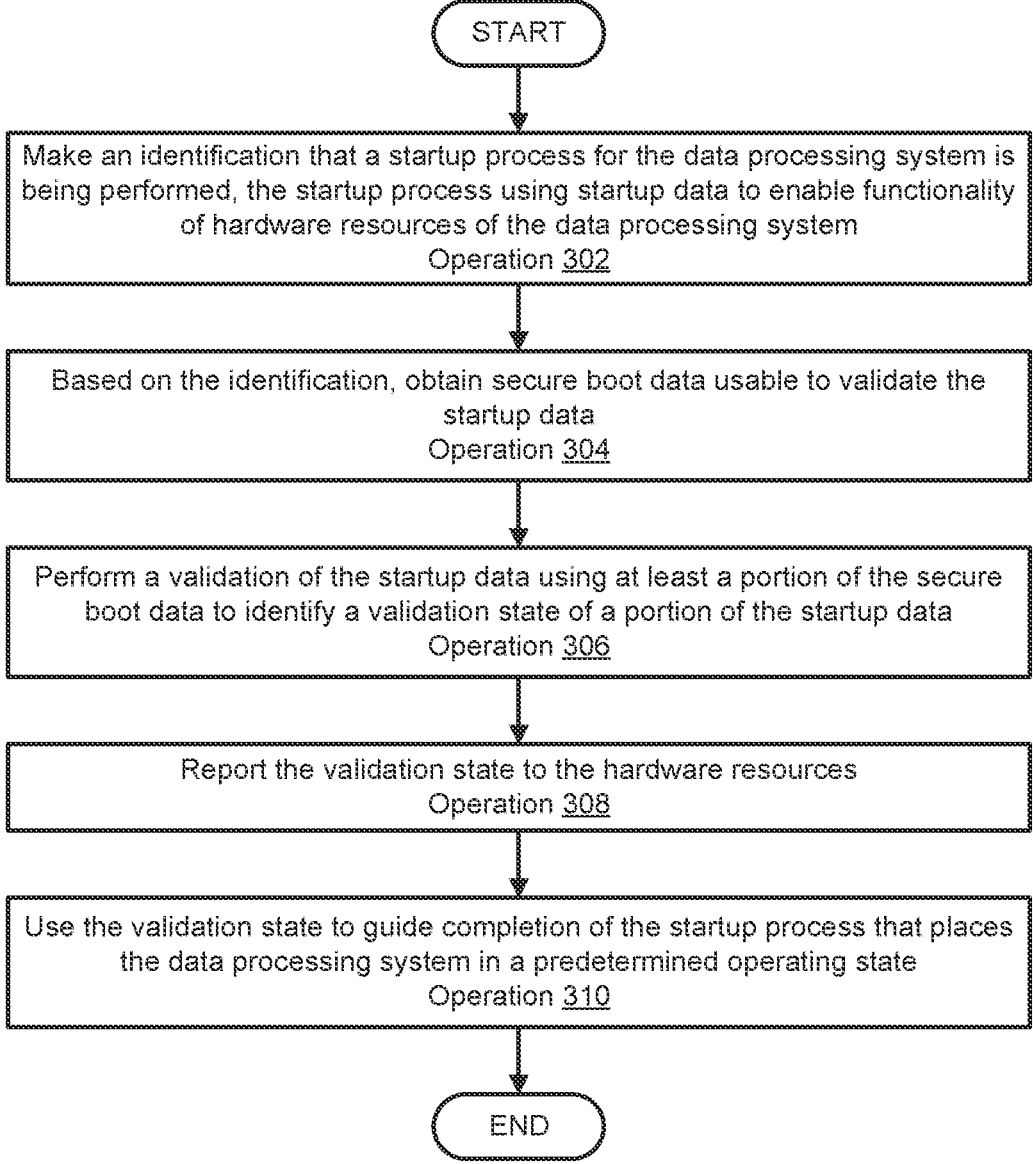

START

Make an identification that a startup process for the data processing system is being performed, the startup process using startup data to enable functionality of hardware resources of the data processing system
Operation 302

Based on the identification, obtain secure boot data usable to validate the startup data
Operation 304

Perform a validation of the startup data using at least a portion of the secure boot data to identify a validation state of a portion of the startup data
Operation 306

Report the validation state to the hardware resources
Operation 308

Use the validation state to guide completion of the startup process that places the data processing system in a predetermined operating state
Operation 310

END

FIG. 3

OFFLOADING SECURE BOOT DURING STARTUPS OF DATA PROCESSING SYSTEMS

FIELD

Embodiments disclosed herein relate generally to managing operation of data processing systems. More particularly, embodiments disclosed herein relate to systems and methods to manage startup of the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3 shows a flow diagram illustrating a method for managing startup of a data processing system in accordance with an embodiment.

DETAILED DESCRIPTION

Figure 1A:
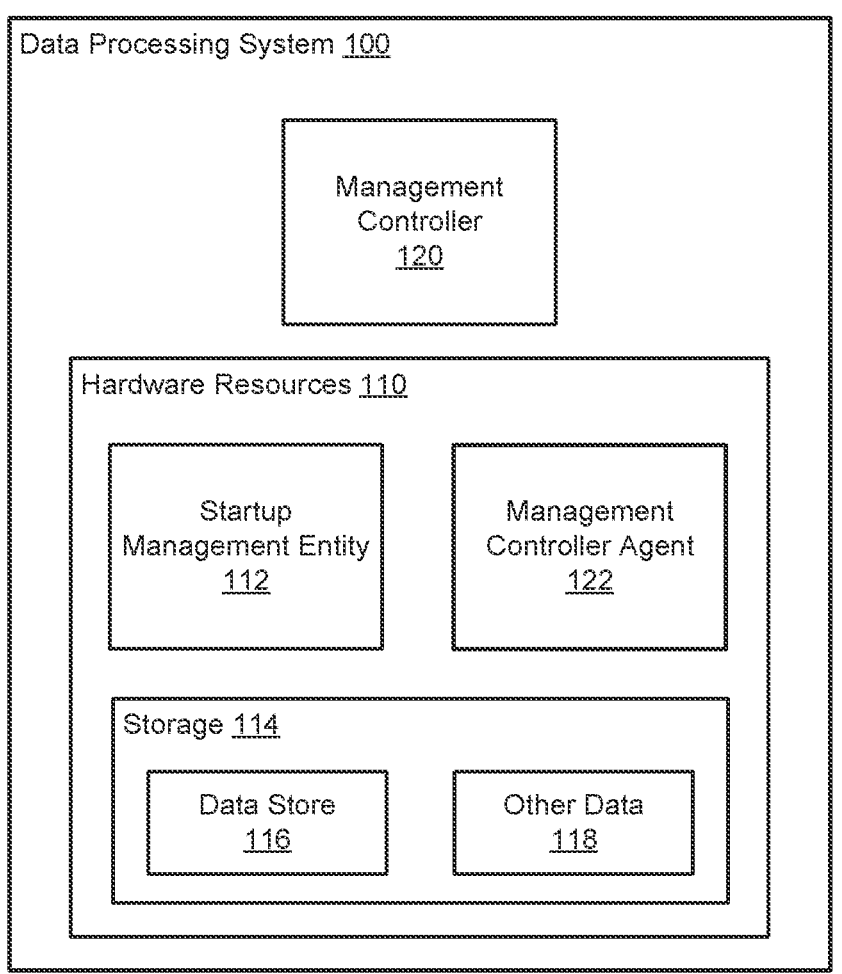
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. The operation of the data processing systems may be managed during startup processes for the data processing systems. During a startup process for a data processing system (e.g., secure boot), startup data may be verified before being used to enable functionality of hardware resources of the data processing system. For example, the startup data may include various program code for drivers, applications, and/or other software, and may be used to perform device initialization, memory verification, inventory collection and/or other tasks related to system startup.

The startup process may be performed by a management entity such as a basic input/output system (BIOS) hosted by a portion of the hardware resources. The management entity may perform a large number of tasks (e.g., data exchanges, computations) associated with the startup of the data processing system. For example, throughout the startup process, the BIOS may verify the integrity of each portion of the startup data (e.g., validate the startup data) prior to authorizing its use in the startup process. However, the performance capacity of the BIOS may be limited (e.g., by the portion of the hardware resources that hosts the BIOS), which may result in prolonged startups of the data processing system. Therefore, to improve the speed of the startup process for the data processing system, tasks related to verifying the startup data may be offloaded to a second management entity (e.g., hosted by a separate portion of hardware resources of the data processing system) for parallel performance.

To verify the integrity of the startup data, each data processing system may host a management controller. During the startup process, portions of startup tasks may be offloaded to the management controller (e.g., by the BIOS) for parallel processing while the BIOS performs other startup tasks. To do so, the management controller may be provided with secure boot data usable to establish trust in the startup data, and the management controller may report validation states for the startup data (e.g., to the BIOS) as it is verified.

By doing so, embodiments disclosed herein may provide a system for managing startup of a data processing system in a manner that reduces startup time and maintains a level of security of a secure boot process.

In an embodiment, a method for operation of a data processing system is provided. The method may include making an identification that a startup process for the data processing system is being performed, the startup process using startup data to enable functionality of hardware resources of the data processing system.

Based on the identification, the method may also include: obtaining, by a management controller of the data processing system, secure boot data usable to validate the startup data; performing, by the management controller, a validation of the startup data using at least a portion of the secure boot data to identify a validation state of a portion of the startup data; reporting, by the management controller, the validation state to the hardware resources; and using, by the hardware resources, the validation state to guide completion of the startup process that places the data processing system in a predetermined operating state.

The secure boot data may include data usable to establish trust in the startup data, and the data may include reduced-size representations of portions of the startup data.

Performing the validation of the startup data may include: obtaining, by the management controller, a reduced-size representation of the portion of the startup data; making a comparison between the reduced-size representation and the portion of the secure boot data to obtain a difference; and, identifying the validation state based on the difference.

The validation of the portion of the startup data may be performed in parallel with validations, by the management controller, of other portions of the startup data.

When the validation state indicates that the startup data includes insufficient trusted startup data for completing a nominal startup process, then using, by the hardware resources, the validation state to guide the completion of the startup process may include completing a remedial startup process for the data processing system.

When the validation state indicates the startup data includes insufficient trusted startup data for completing the nominal startup process and/or the remedial startup process, then using, by the hardware resources, the validation state to guide the completion of the startup process may include aborting the startup process to place the data processing system in a secure operating state.

When the validation state indicates the startup data includes sufficient trusted startup data for completing the nominal startup process, then using, by the hardware resources, the validation state to guide the completion of the startup process may include completing the nominal startup process for the data processing system.

The nominal startup process may place the data processing system in a first operating state that allows for computer-implemented services to be provided, and the remedial startup process may place the data processing system in a second operating state that allows for partial provisioning of the computer-implemented services, and the secure operating state may deprive the data processing system of the ability to provide the computer-implemented services.

Obtaining the secure boot data may include: reading, by a startup management entity hosted by the hardware resources and from a secure storage of the hardware resources, the secure boot data; and, providing, by the startup management entity and via a sideband channel, the secure boot data to the management controller.

The secure storage may include a serial peripheral interface (SPI) storage device.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services. The computer-implemented services may include, for example, database services, data processing services, electronic communication services, and/or any other services that may be provided using one or more computing devices. Other types of computer-implemented services may be provided by the system without departing from embodiments disclosed herein.

To provide the computer-implemented services, the system (e.g., a data processing system) may undergo a startup process during which functionality of a portion of its hardware and/or software components may be enabled. For example, the computer-implemented services may require access to processors, memory modules, storage devices, communication devices, etc. The hardware components may support execution of any number and/or types of software components (e.g., applications), and, in some combination, the hardware and software components may provide for various types of computer-implemented services.

To perform the startup process, a startup management entity of the data processing system may access, verify, and use data (e.g., startup data) stored by the data processing system. The startup data may include instructions and/or pieces of software usable for facilitating various tasks of the startup process (e.g., tasks for performing device verification and initialization, and/or other tasks related to enabling and/or securing hardware functionality).

For example, during a secure boot of the data processing system, the tasks may include security checks where integrity of portions of the startup data are validated (e.g., secure boot verification). Secure boot verification may be performed in order to establish trust in each portion of the startup data before use (e.g., execution), so that exposure to malicious or erroneous software is unlikely. Doing so may reduce the risk of compromise of the data processing system, errors occurring during startup, etc. The tasks associated with secure boot verification may be performed by the startup management entity in sequence throughout the startup process.

However, the capacity of the startup management entity to perform the startup tasks may be limited (e.g., due to its host hardware and/or its program code). For example, operation of the startup management entity may be limited by a single processor that executes instructions one after the other in a specific order (e.g., as in sequential processing). Since each of the startup tasks may also have some degree of time dependence, these limitations may cause bottlenecks (e.g., delays in completion of the startup process). Such delays may negatively affect the quality and/or availability of the computer-implemented services.

In general, embodiments disclosed herein may provide methods, systems, and/or devices for managing data processing system in a manner that may improve its startup speed. To do so, the data processing system may include a management controller. To alleviate the processing load for the startup management entity, a portion of the tasks associated with secure boot verification may be offloaded to an additional management entity hosted by the management controller. The management controller may include hardware that allows for parallel processing and therefore may be able to complete its assigned tasks at a faster rate than hardware hosting the startup management entity. By doing so, both management entities may run concurrently during the startup process in order to increase the likelihood of timely startup of the data processing system and timely provision of the computer-implemented services.

To provide the above-mentioned functionality, data processing system 100 may include hardware resources 110 and/or management controller 120. Data processing system 100, any components thereof and/or any other types of devices or components not shown in FIG. 1A may perform all, or a portion of the computer-implemented services independently and/or cooperatively. Each of these components is discussed below.

Hardware resources 110 may include processors, memory, storage, and/or other hardware components. In order to provide the computer-implemented services, hardware resources 110 may be required to be in a predetermined operating state. For example, the predetermined operating state may include hosting an operating system, various applications, etc. To enter the predetermined operating state, a startup process may need to be performed. The startup process may be performed cooperatively by hardware resources 110 and management controller 120.

To facilitate cooperation between hardware resources 110 (e.g., during the startup process) and management controller 120, hardware resources 110 may host management controller agent 122. Management controller agent 122 may facilitate communication with and performance of instructions by management controller 120. To perform the startup process, hardware resources 110 may host startup management entity 112.

Startup management entity 112 may initiate and/or provide startup services for data processing system 100. Startup management entity 112 may include a basic input/output system (BIOS) and/or may be hosted by a portion of hardware resources 110 (e.g., a processor). To provide the startup services, startup management entity 112 may (i) identify tasks associated with a startup process for data processing system 100, (ii) perform tasks locally (e.g., using the host portion of hardware resources 110), (iii) offload tasks to a separate management entity for completion, (iv) obtain information regarding offloaded tasks (e.g., from the separate management entity), and/or (v) perform other actions.

Some of the tasks discussed above may include tasks for performing secure boot verification, where data used in the startup process (e.g., startup data) is verified to be trustworthy. To verify that the startup data is trustworthy, secure boot data may be used to verify the integrity and trust in the startup data (e.g., various portions of the startup data) prior to use of the (various portions of) the startup data. For example, the secure boot data may include hashes and/or other types of information usable to cryptographically verify trust and integrity of the startup data. The secure boot data may be stored in data store 116.

Management controller 120 may be used to verify the trust and integrity of the startup data. For example, management controller 120 may perform secure boot verification for the startup data. To do so, (i) management controller agent 122 may provide the secure boot data and/or the startup data for verification to (a management entity hosted by) management controller 120, (ii) management controller 120 may use the provided secure boot data to attempt to cryptographically verify the startup data, (iii) management controller 120 may provide information regarding the attempts to cryptographically verify the startup data to startup management entity 112, and/or (iv) other operations may be performed to secure startup processes performed by data processing system 100. For additional details regarding verification of startup data, refer to the discussion of FIG. 2.

Management controller 120 may be distinct from and/or may operate independently from hardware resources 110. Refer to the discussion of FIG. 1B for more information regarding the functionality of management controller 120.

As discussed above, the secure boot data may be stored in data store 116. For example, hardware resources 110 may include storage 114. Storage 114 may include any quantity and/or type of data storage hardware and/or memory hardware components. Data stored in storage 114 may include data store 116 and other data 118. Each of these data structures is discussed below.

Data store 116 may be a data structure that includes information used in performance of startups of data processing system 100. The information may include, for example, (i) images or reduced-size representations of portions of startup data (e.g., various programs that may be used during the startups), (ii) the secure boot data, and/or (iii) any other type of data usable to perform the startups to place data processing system 100 in operating states conducive to provisioning of computer-implemented services. For example, data store 116 may be stored in a serial peripheral interface (SPI) storage device.

Other data 118 may be a data structure that include any type and/or quantity of data usable by data processing system 100 and/or other devices. For example, other data 118 may be stored in general storage devices such as hard disk drives, solid state drives, etc.

When providing their functionality, any components of data processing system 100 may perform all, or a portion of the method shown in FIG. 3.

Data processing system 100 (and/or components thereof) may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, data processing system 100 is implemented using an IoT device, which may include a computing device. The IoT device may operate in accordance with a communication model and/or management model known to data processing system 100 and/or other devices.

While illustrated in FIG. 1A as including a limited number of specific components, a system in accordance with an embodiment may include fewer, additional, and/or different components than those illustrated therein.

Figure 1B:
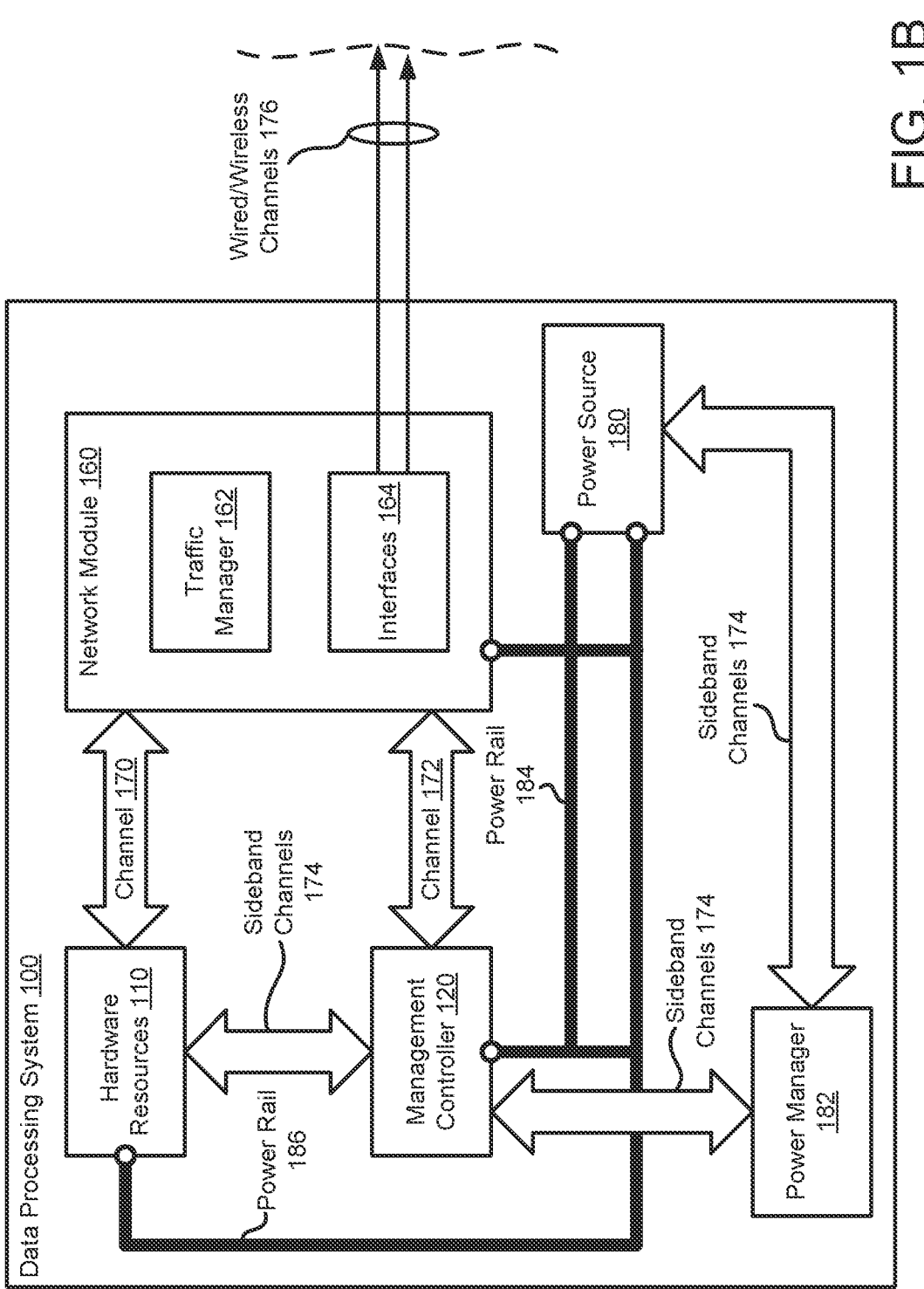
FIG. 1B shows a block diagram illustrating components of a data processing system in accordance with an embodiment.

Turning to FIG. 1B, a diagram illustrating components of a data processing system in accordance with an embodiment is shown. The components of the data processing system shown in FIG. 1B may be similar to those of the system shown in FIG. 1A.

To provide computer-implemented services, data processing system 100 may include any quantity of hardware resources 110. Hardware resources 110 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 110 to communicate with other devices via packet switched networks and/or other types of communication networks.

The processor may also host various applications that provide the computer-implemented services. The applications may utilize various services provided by the management entities and use (at least indirectly) the network stack to communication with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100) to another device via any number of intermediate networks (e.g., via wired/wireless channels 176 that are part of the networks).

To reduce the likelihood of the applications and/or other in-band entities from being indirectly compromised, data processing system 100 may include management controller 120 and network module 160. Each of these components of data processing system 100 is discussed below.

Management controller 120 may be implemented, for example, using a system on a chip or other type of independently operating computing device (e.g., independent from the in-band components, such as hardware resources 110, of a host data processing system 100). Management controller 120 may provide various management functionalities for data processing system 100. For example, management controller 120 may monitor various ongoing processes performed by the in-band components, may manage power distribution, may participate in thermal management, and/or other may perform other functions, such as participating in startup processes for data processing system 100.

To do so, management controller 120 may be operably connected to various components via sideband channels 174 (in FIG. 1B, a limited number of sideband channels are included for illustrative purposes, it will be appreciated that management controller 120 may communication with other components via any number of sideband channels). The sideband channels may be implemented using separate physical channels, and/or with a logical channel overlay over existing physical channels (e.g., logical division of in-band channels). The sideband channels may allow management controller 120 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, sideband channels 174 may facilitate communications between management controller 120 and hardware resources 110 during a startup process for data processing system 100. During the startup process, a startup management entity (e.g., 112) hosted by hardware resources 110 may exchange data (e.g., secure boot data, startup data, instructions) with a management entity hosted by management controller 120. For example, management controller 120 may obtain and perform offloaded startup tasks from hardware resources 110, and provide information regarding the performance and/or completion of the offloaded startup tasks to hardware resources 110.

To reduce the likelihood of indirect compromise of an application hosted by hardware resources 110, management controller 120 may enable information from other devices to be provided to the application without traversing the network stack and/or management entities of hardware resources 110. To do so, the other devices may direct communications including the information to management controller 120. Management controller 120 may then, for example, send the information via sideband channels 174 to hardware resources 110 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 120 may be operably connected to communication components of data processing system 100 via separate channels (e.g., 172) from the in-band components, and may implement or otherwise utilize a distinct and independent network stack (e.g., TCP/IP). Consequently, management controller 120 may communication with other devices independently of any of the in-band components (e.g., does not rely on any hosted software, hardware components, etc.). Accordingly, compromise of any of hardware resources 110 and hosted component may not result in indirect compromise of any management controller 120, and entities hosted by management controller 120.

To facilitate communication with other devices, data processing system 100 may include network module 160. Network module 160 may provide communication services for in-band components and out-of-band components (e.g., management controller 120) of data processing system. To do so, network module 160 may include traffic manager 162 and interfaces 164.

Traffic manager 162 may include functionality to (i) discriminate traffic directed to various network endpoints advertised by data processing system 100, and (ii) forward the traffic to/from the entities associated with the different network endpoints. For example, to facilitate communications with other devices, network module 160 may advertise different network endpoints (e.g., different media access control address/internet protocol addresses) for the in- band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 120 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These components may support any number of wired/wireless channels 176.

Thus, from the perspective of an external device, the in-band components and the out- of-band components of data processing system 100 may appear to be two independent network entities, that may independently addressable, and otherwise unrelated to one another.

To facilitate management of data processing system 100 over time, hardware resources 110, management controller 120 and/or network module 160 may be positioned in separately controllable power domains. By being positioned in these separately power domains, different subsets of these components may remain powered while other subsets are unpowered.

For example, management controller 120 and network module 160 may remain powered while hardware resources 110 is unpowered. Consequently, management controller 120 may remain able to communication with other devices even while hardware resources 110 are inactive. Similarly, management controller 120 may perform various actions while hardware resources 110 are not powered and/or are otherwise inoperable, unable to cooperatively perform various process, are compromised, and/or are unavailable for other reasons.

To implement the separate power domains, data processing system 100 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180, and power may be supplied via the power rails. Management controller 120 may cooperate with power manager 182 to manage supply of power to these power domains. Management controller 120 may communicate with power manager 182 via sideband channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2:
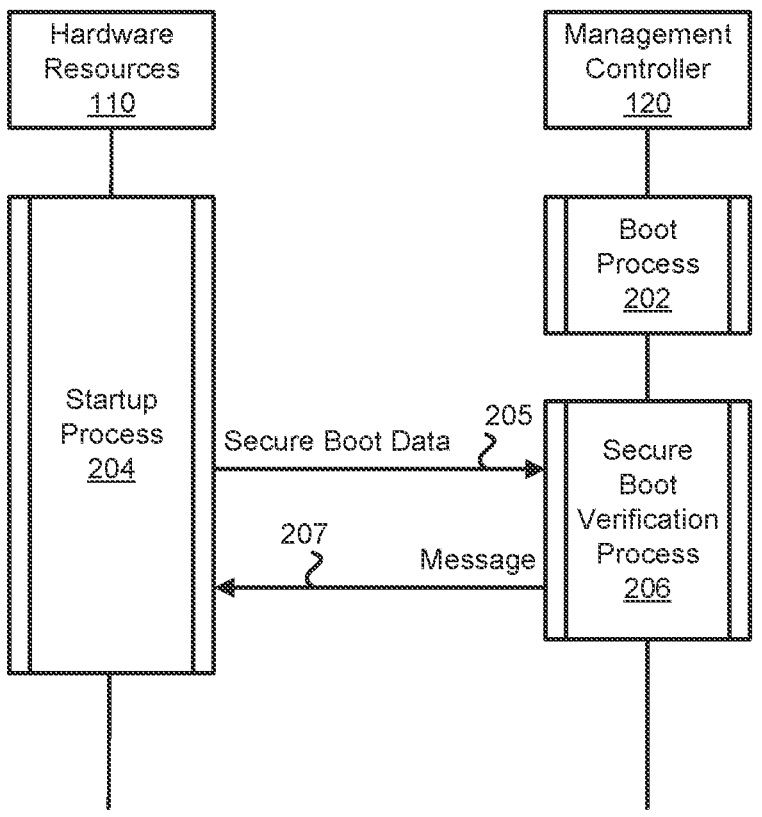
FIG. 2 shows an interaction diagram illustrating an example of a startup process for a data processing system in accordance with an embodiment.

To further clarify embodiments disclosed herein, an interaction diagram in accordance with an embodiment is shown in FIG. 2. The interaction diagram may illustrate how data may be obtained and used within the system of FIGS. 1A-1B.

In the interaction diagram, processes performed by and interactions between components of a system in accordance with an embodiment are shown. In the diagrams, components of the system are illustrated using a first set of shapes (e.g., 110, 120), located towards the top of the figure. Lines descend from these shapes. Processes performed by the components of the system are illustrated using a second set of shapes (e.g., 202, 204, etc.) superimposed over these lines.

Interactions (e.g., communication, data transmissions, etc.) between the components of the system are illustrated using a third set of shapes (e.g., 205, 207) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 205 may occur prior to the interaction labeled as 207. However, it will be appreciated that the processes and interactions may be performed in different orders, any may be omitted, and other processes or interactions may be performed without departing from embodiments disclosed herein.

Turning to FIG. 2, an interaction diagram in accordance with an embodiment is shown. The interaction diagram may illustrate flows of data and processing of data to improve startup performance for a data processing system.

To improve the startup performance, management controller 120 may perform boot process 202, and hardware resources 110 may perform startup process 204. Boot process 202 and/or startup process 204 may be initiated, for example, when the data processing system is powered on.

During boot process 202, a management entity for management controller 120 may be loaded. The management entity may include a trusted operating system. The management entity may manage operation of management controller 120 so that secure boot verification process 206 may be performed.

During startup process 204, (i) hardware resources 110 may be inventoried, (ii) various programs (e.g., portions of the startup data) may be loaded and begin to execute, (iii) various configurations for the hardware and/or software components may be set and/or verified, and/or (iv) other actions may be performed to complete startup process 204 and handoff management of the data processing system to a management entity (e.g., an operating system).

To load the various programs, the program code for these programs may be verified prior to use during startup process 204. To do so, hashes of the program code may be compared to corresponding portions of the secure boot data (e.g., hashes that correspond to known good copies of the program code).

However, verification of the startup data (e.g., the various programs) using the secure boot data may be computationally expensive and therefore may increase the amount of time required to complete startup process 204. To reduce the time required to complete startup process 204, the verification process may be offloaded to management controller 120. Refer to the discussion of secure boot verification process 206.

To facilitate secure boot verification process 206, at interaction 205, the secure boot data may be provided to management controller 120. For example, the secure boot data may be obtained (e.g., copied from SPI storage) by hardware resources 110 and may be provided to management controller 120 via a secure sideband channel by (i) transmission via a message, (ii) storing in a storage with subsequent retrieval by management controller 120, (iii) a publish-subscribe system where management controller 120 subscribes to updates from hardware resources 110 thereby causing a copy of the secure boot data to be propagated to management controller 120, and/or (iv) other processes. Management controller 120 may use the secure boot data to verify the integrity of the program code that may be used during startup process 204. The integrity of the program code may be conveyed back to hardware resources 110 via one or more messages at interaction 207.

Consequently, startup process 204 may use the received messages to complete startup process 204. For example, depending on which portions of program code are found to be trusted based on the messages, different types of processes may be performed to guide the completion of startup process 204 (e.g., to manage impacts of untrustworthy program code). A startup policy for the data processing system may specify which portions of the program code are required to be trusted (e.g., critical portions, non-critical portions) in order to perform various types of startup completions.

For example, if sufficient portions of the program code are found to be trusted (e.g., based on the startup policy), then a nominal completion of startup process 204 may be performed. In other words, startup process 204 may result in eventual handoff of to an operating system of the data processing system. The nominal completion of startup process 204 may enable necessary functionality of hardware resources 110 in order to host various applications that allow for the provision of computer-implemented services.

However, if insufficient portions of the program code are found to be trusted for the nominal completion of startup process 204, but sufficient portions of the program code are found to be trusted for a remedial completion of startup process 204 (e.g., if the portions of the program code that are found to be not trusted are non-critical), then startup process 204 may complete with limited functionality of hardware resources 110. The limited functionality of hardware resources 110 may only allow for a provision of a portion of the computer-implemented services.

Otherwise, if insufficient portions of the program code are found to be trusted for the nominal completion of startup process 204 and insufficient portions of the program code are found to be trusted for the remedial completion of startup process 204 (e.g., if critical program code is not found to be trusted), then startup process 204 may abort startup of the data processing system. Aborting the startup may deprive the data processing system from providing the computer-implemented services. For example, the operation of the data processing system may remain locked until sufficient portions of the program code are found to be trusted for other types of startup completions.

As previously discussed, to reduce the time required to complete startup process 204, the verification of the startup data may be offloaded to management controller 120. To do so, management controller 120 may receive the secure boot data from hardware resources 110 (e.g., at interaction 205). The secure boot data may include data usable to establish trust in (e.g., validate) the startup data. For example, the secure boot data may include reduced-size representations of potions of the startup data, such as hashes of program code used during the startup process. These hashes may be generated using a predetermined hash function. The secure boot data may be used to identify trusted portions of the startup data through hash matching.

Upon receiving the secure boot data, management controller 120 may perform secure boot verification process 206. During secure boot verification process 206, management controller 120 may (i) generate reduced-size representations (e.g., hashes) of portions of the startup data, (ii) identify portions of the secure boot data that correspond to the portions of the startup data (e.g., based on program code identifiers), and (iii) compare the reduced-size representations of the portions of the startup data to the corresponding portions of the secure boot data to obtain a validation states for the portions of the startup data.

For example, if a reduced-size representation of a portion of the startup data matches (e.g., exactly) a corresponding portion of the secure boot data, then the validation state of the portion of the startup data may be trusted. Otherwise, if the reduced-size representation of the portion of the startup data does not match the corresponding portion of the secure boot data, then the validation state of the portion of the startup data may be untrusted. Management controller 120 may perform startup data validation tasks for portions of the startup data in parallel, and may report the results (e.g., validation states) to hardware resources 110. The validation states may, for example, be included in a message provided to hardware resources 110.

At interaction 207, the validation states (e.g., the message) may be provided to hardware resources 110 by management controller 120 via a secure sideband channel by (i) transmission via a message, (ii) storing in a storage with subsequent retrieval by hardware resources 110, (iii) a publish-subscribe system where hardware resources 110 subscribes to updates from management controller 120 thereby causing a copy of the message to be propagated to hardware resources 110, and/or (iv) other processes. For example, management controller 120 may write validation states for various pieces of program code to a registry of the data processing system, and hardware resources 110 may retrieve the validation states from the registry.

By offloading resource-heavy tasks such as secure boot verification to other components of the data processing system (e.g., management controller 120), the limited resources available to the startup management entity may be allocated to performing other startup actions based on the validation states.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, the processes and interactions shown in FIG. 2 may describe a method for reducing time required for startup of a data processing system by distributing a startup workload among multiple components of the data processing system for secure parallel processing.

Turning to FIG. 3, a flow diagram illustrating a method in accordance with an embodiment is shown. The flow diagram may illustrate various operations performed while managing startup of a data processing system. The data processing system and may include hardware resources and a management controller, similar to the data processing system discussed with respect to FIGS. 1A-1B.

At operation 302, an identification that a startup process for the data processing system is being performed may be made. The identification may be made by a startup management entity hosted by a portion of the hardware resources and/or a second management entity hosted by the management controller. As a first example, the identification may be made by the startup management entity by (i) identifying a power state of the data processing system and/or (ii) identifying that code corresponding to the startup management entity has been loaded into a processor (e.g., the portion of the hardware resources) for execution.

As a second example, the identification may be made by the second management entity by (i) identifying the power state of the data processing system, (ii) identifying activity of the hardware resources, (iii) receiving a message (e.g., from the startup management entity), and/or (iv) other methods. The management controller may, for example, use sideband communication channels (as discussed with respect to FIG. 1B) to monitor the power state of the data processing system, monitor activity of the hardware resources, obtain communications from the hardware resources, and/or perform other actions.

During the startup process, startup data may be used (e.g., instructions of the startup data may be executed) to enable functionality of the hardware resources. Based on the identification that the startup process is being performed, the following operations (e.g., 304-310) may occur.

At operation 304, secure boot data usable to validate the startup data may be obtained. The secure boot data may be obtained (e.g., from the hardware resources and by the management controller) by (i) receiving the secure boot data from another entity, (ii) reading the secure boot data from storage, and/or (iii) other methods. For example, the startup management entity may read the secure boot data from a secure storage of the hardware resources, such as a SPI storage device, before providing the secure boot data to the management controller (e.g., via a sideband channel of the sideband channels). The secure boot data may be used for secure boot verification.

At operation 306, a validation of the startup data may be performed. The validation may be performed using at least a portion of the secure boot data to identify a validation state of a portion of the startup data. Performing the validation of the startup data may include verifying authenticity and integrity of the startup data. For example, the validation may be performed by (i) obtaining a reduced-size representation of the portion of the startup data, (ii) making a comparison between the reduced-size representation of the portion of the startup data and the (corresponding) at least a portion of the secure boot data to obtain a difference, and (iii) identifying the validation state based on the difference.

The validation of the startup data may be performed by the management controller. For example, the validation may be performed by obtaining a hash value of a piece of software meant to be executed during the startup process.

The hash value may be generated (e.g., by the management controller) using a predetermined hash function that was used to generate the secure boot data. Performing the validation may include comparing the hash value to a corresponding portion of the secure boot data (e.g., a second hash value) in order to obtain the difference. The difference may be zero (e.g., when the hash values match) or nonzero (e.g., when the hash values do not match).

The validation state may be identified by reading the difference. For example, if the difference is zero, then the validation state for the piece of software is trusted (e.g., the portion of the startup data is trusted startup data). Otherwise, if the difference is nonzero, then the validation state for the piece of software is not trusted (e.g., the portion of the startup data is not trusted startup data).

The validation of the piece of software (e.g., the portion of the startup data) may be performed in parallel with validations of other pieces of software (e.g., other portions of the startup data). By performing the validation of the portion of the startup data in parallel (e.g., out of order) with other validations of the other portions of the startup data, the secure boot verification process may be completed faster than if performed in sequence (e.g., in order).

At operation 308, the validation state may be reported to the hardware resources. The validation state may be reported by providing a message regarding the validation state of the portion of the startup data to a portion of the hardware resources. For example, the management controller may write information regarding the validation state (e.g., the validation state, an identifier for the portion of the startup data, and/or other information) to a registry, a memory location, etc., that may be accessed by the startup management entity during the startup process.

At operation 310, the validation state may be used to guide completion of the startup process. The validation state may be used by (i) reading the validation state for the portion of the startup data and/or other portions of the startup data to identify trusted startup data, and (ii) performing the startup process using only the trusted startup data (e.g., excluding portions of the startup data that are not trusted). The completion of the startup process may be guided based on whether sufficient trusted startup data is present.

In a first example, if the startup data includes sufficient trusted startup data for completing a nominal startup (e.g., based on a predetermined list of portions of the startup data required for a nominal startup), then the hardware resources may complete the nominal startup process for the data processing system. The nominal startup process may place the data processing system in a first operating state that allows for (desired) computer-implemented services to be provided. The computer-implemented services may be provided, for example, by executing software using the hardware resources.

In a second example, if the startup data includes insufficient trusted startup data for completing the nominal startup process but includes sufficient trusted startup data for completing a remedial startup process (e.g., based on a predetermined list of portions of the startup data required for the remedial startup), then the hardware resources may complete the remedial startup process for the data processing system. The remedial startup process may place the data processing system in a second operating state that allows for partial provisioning of the computer-implemented services. For example, some functionality (e.g., hardware or software) of the data processing system may be limited upon completion of the remedial startup, allowing for only a portion of the desired computer-implemented services using the data processing system (e.g., functionality that may be enabled for security purposes).

In a third example, if the startup data includes insufficient trusted startup data for completing the nominal startup process and insufficient trusted startup data for completing the remedial startup process, then the hardware resources may abort the startup process. Aborting the startup process may place the data processing system in a secure operating state. While in the secure operating state, the data processing system may be deprived of providing the desired computer-implemented services. For example, the secure operating state may include an operating state where functionality of the data processing system is disabled (e.g., the data processing system may be automatically powered off and/or remain inaccessible).

The method may end following operation 310.

Thus, as illustrated above, embodiments disclosed herein may provide systems and methods usable to manage secure startup of a data processing system using an additional management entity hosted by secure hardware (e.g., a management controller) included in the data processing system. By doing so, startup speeds may be more likely to be improved, which may result in improved uptime of the data processing system and availability of the computer- implemented services.

Thus, embodiments disclosed herein may provide an improved computing device that is able to increase the likelihood of providing desired computer-implemented services that may rely on the data processing system being in a predetermined operating state. Accordingly, the disclosed process provides for both an embodiment in computing technology and an improved method for managing operation of the data processing system.

Figure 4:
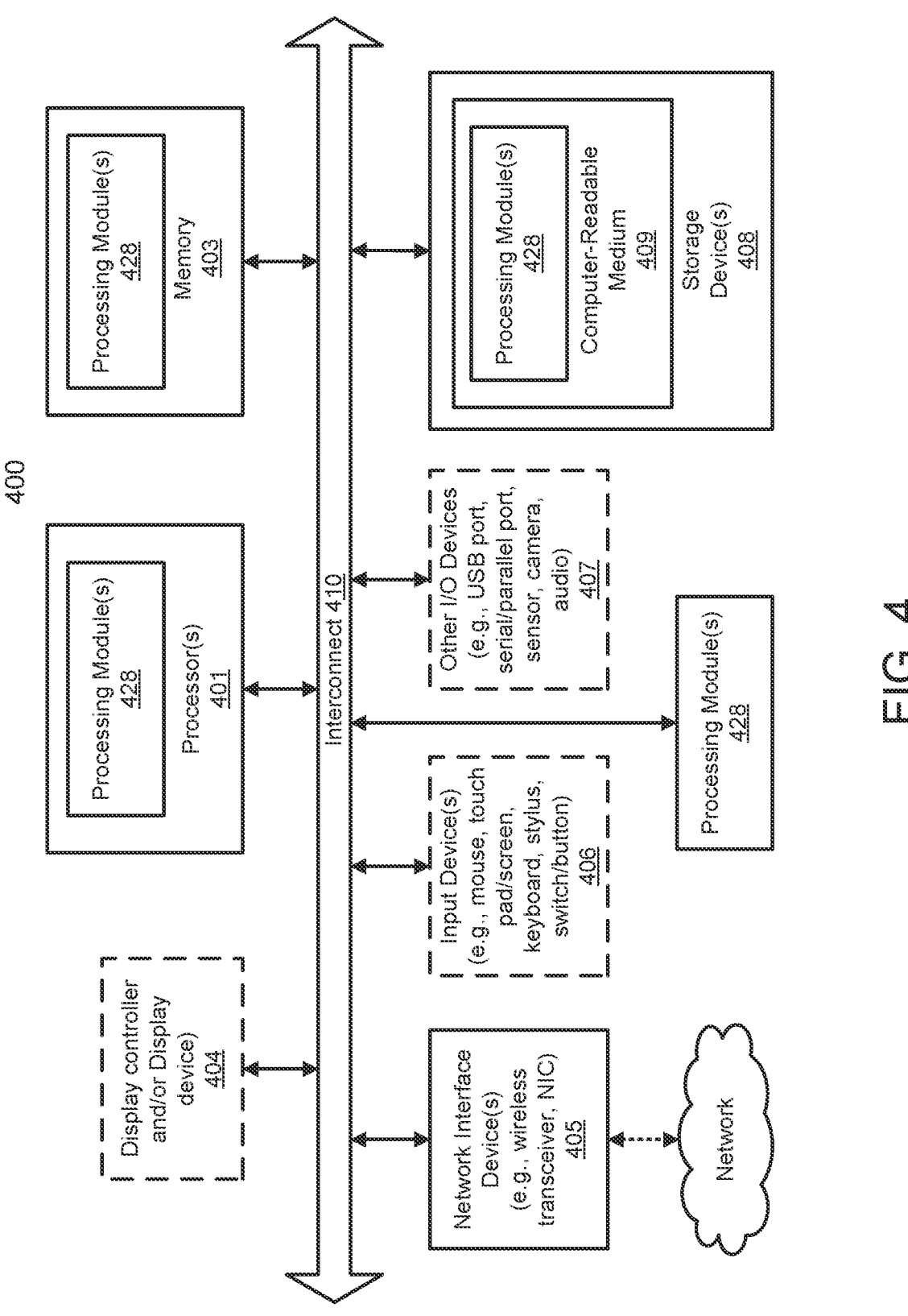
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random- access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as a SSD cache to enable non- volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

making an identification that a startup process for the data processing system is being performed, the startup process using startup data to enable functionality of hardware resources of the data processing system; and based on the identification:

obtaining, by a management controller of the data processing system, secure boot data usable to validate the startup data, performing, by the management controller, a validation of the startup data using at least a portion of the secure boot data to identify a validation state of a portion of the startup data, wherein the validation state indicates whether the startup data comprises a first predetermined amount of trusted startup data for completing one or more types of the startup process, the first predetermined amount being based on a predetermined list of trusted startup data, reporting, by the management controller, the validation state to the hardware resources, and using, by the hardware resources, the validation state to guide completion of the startup process that places the data processing system in a predetermined operating state, wherein when the validation state indicates that the startup data comprises a first instance of the first predetermined amount of the trusted startup data required for completing a remedial startup process but not for completing a nominal startup process, then using, by the hardware resources, the validation state to guide the completion of the startup process comprises:

completing the remedial startup process for the data processing system.

2. The method of claim 1, wherein the secure boot data comprises data usable to establish trust in the startup data in order to determine an amount of the trusted startup data contained in the startup data, and the data usable to establish trust comprises reduced-size representations of portions of the startup data.

3. The method of claim 1, wherein performing the validation of the startup data comprises:

obtaining, by the management controller, a reduced-size representation of the portion of the startup data;

making a comparison between the reduced-size representation and the portion of the secure boot data to obtain a difference; and identifying the validation state based on the difference.

4. The method of claim 1, wherein the validation of the portion of the startup data is performed in parallel with validations, by the management controller, of other portions of the startup data.

5. The method of claim 1, wherein when the validation state indicates the startup data comprises a second predetermined amount of the trusted startup different from the first predetermined amount, then using, by the hardware resources, the validation state to guide the completion of the startup process comprises:

aborting the startup process to place the data processing system in a secure operating state, the second predetermined amount also being based on the predetermined list of trusted startup data.

6. The method of claim 1, wherein when the validation state indicates the startup data comprises a second instance of the first predetermined amount of the trusted startup data required for completing the nominal startup process, then using, by the hardware resources, the validation state to guide the completion of the startup process comprises:

completing the nominal startup process for the data processing system, the second instance being an amount different from the first instance.

7. The method of claim 5, wherein the nominal startup process places the data processing system in a first operating state that allows for computer-implemented services to be provided, and the remedial startup process places the data processing system in a second operating state that allows for partial provisioning of the computer-implemented services, and the secure operating state deprives the data processing system of providing the computer-implemented services.

8. The method of claim 1, wherein obtaining the secure boot data comprises:

reading, by a startup management entity hosted by the hardware resources and from a secure storage of the hardware resources, the secure boot data; and providing, by the startup management entity and via a sideband channel, the secure boot data to the management controller.

9. The method of claim 8, wherein the secure storage comprises a serial peripheral interface storage device.

10. A non-transitory machine-readable medium having instructions stored therein, which when executed by a processor, cause the processor to perform operations for managing operation of a data processing system, the operations comprising:

making an identification that a startup process for the data processing system is being performed, the startup process using startup data to enable functionality of hardware resources of the data processing system; and based on the identification:

obtaining, by a management controller of the data processing system, secure boot data usable to validate the startup data, performing, by the management controller, a validation of the startup data using at least a portion of the secure boot data to identify a validation state of a portion of the startup data, wherein the validation state indicates whether the startup data comprises a first predetermined amount of trusted startup data for completing one or more types of the startup process, the first predetermined amount being based on a predetermined list of trusted startup data, reporting, by the management controller, the validation state to the hardware resources, and using, by the hardware resources, the validation state to guide completion of the startup process that places the data processing system in a predetermined operating state, wherein when the validation state indicates that the startup data comprises a first instance of the first predetermined amount of the trusted startup data required for completing a remedial startup process but not for completing a nominal startup process, then using, by the hardware resources, the validation state to guide the completion of the startup process comprises:
completing the remedial startup process for the data processing system.

11. The non-transitory machine-readable medium of claim 10, wherein the secure boot data comprises data usable to establish trust in the startup data in order to determine an amount of the trusted startup data contained in the startup data, and the data usable to establish trust comprises reduced-size representations of portions of the startup data.

12. The non-transitory machine-readable medium of claim 10, wherein performing the validation of the startup data comprises:
obtaining, by the management controller, a reduced-size representation of the portion of the startup data;
making a comparison between the reduced-size representation and the portion of the secure boot data to obtain a difference; and
identifying the validation state based on the difference.

13. The non-transitory machine-readable medium of claim 10, wherein the validation of the portion of the startup data is performed in parallel with validations, by the management controller, of other portions of the startup data.

14. The non-transitory machine-readable medium of claim 10, wherein obtaining the secure boot data comprises:
reading, by a startup management entity hosted by the hardware resources and from a secure storage of the hardware resources, the secure boot data; and
providing, by the startup management entity and via a sideband channel, the secure boot data to the management controller.

15. The non-transitory machine-readable medium of claim 14, wherein the secure storage comprises a serial peripheral interface storage device.

16. A data processing system, comprising:
a processor; and
a memory coupled to the processor to store instructions, which when executed by the processor, cause the processor to perform operations for managing operation of the data processing system, the operations comprising:
making an identification that a startup process for the data processing system is being performed, the startup process using startup data to enable functionality of hardware resources of the data processing system, and
based on the identification:

obtaining, by a management controller of the data processing system, secure boot data usable to validate the startup data;
performing, by the management controller, a validation of the startup data using at least a portion of the secure boot data to identify a validation state of a portion of the startup data, wherein the validation state indicates whether the startup data comprises a first predetermined amount of trusted startup data for completing one or more types of the startup process, the first predetermined amount being based on a predetermined list of trusted startup data;
reporting, by the management controller, the validation state to the hardware resources; and
using, by the hardware resources, the validation state to guide completion of the startup process that places the data processing system in a predetermined operating state, wherein when the validation state indicates that the startup data comprises a first instance of the first predetermined amount of the trusted startup data required for completing a remedial startup process but not for completing a nominal startup process, then using, by the hardware resources, the validation state to guide the completion of the startup process comprises:
completing the remedial startup process for the data processing system.

17. The data processing system of claim 16, wherein the secure boot data comprises data usable to establish trust in the startup data in order to determine an amount of the trusted startup data contained in the startup data, and the data usable to establish trust comprises reduced-size representations of portions of the startup data.

18. The data processing system of claim 16, wherein performing the validation of the startup data comprises:
obtaining, by the management controller, a reduced-size representation of the portion of the startup data;
making a comparison between the reduced-size representation and the portion of the secure boot data to obtain a difference; and
identifying the validation state based on the difference.

19. The data processing system of claim 16, wherein the validation of the portion of the startup data is performed in parallel with validations, by the management controller, of other portions of the startup data.

20. The data processing system of claim 16, wherein obtaining the secure boot data comprises:
reading, by a startup management entity hosted by the hardware resources and from a secure storage of the hardware resources, the secure boot data; and
providing, by the startup management entity and via a sideband channel, the secure boot data to the management controller.

* * * * *